US012719405B2

(12) United States Patent
Moseley et al.

(10) Patent No.: US 12,719,405 B2
(45) Date of Patent: Aug. 25, 2026

(54) LEARNING AXIS-TILT AND CROSS-AXIS SLOPES FOR SLOPE-AWARE BACKTRACKING

(71) Applicant: ARRAY TECH, INC., Albuquerque, NM (US)

(72) Inventors: John Moseley, Albuquerque, NM (US); Kyumin Lee, Albuquerque, NM (US); Kendra Lynn Conrad, Albuquerque, NM (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 19/413,988

(22) Filed: Dec. 9, 2025

(65) Prior Publication Data

US 2026/0163518 A1 Jun. 11, 2026

Related U.S. Application Data

(60) Provisional application No. 63/729,796, filed on Dec. 9, 2024.

(51) Int. Cl.
*H02S 20/32* (2014.01)

(52) U.S. Cl.
CPC .................................... *H02S 20/32* (2014.12)

(58) Field of Classification Search
CPC ....................................................... H02S 20/32
See application file for complete search history.

(56) References Cited

U.S. PATENT DOCUMENTS

| | | | |
|---|---|---|---|
| 6,281,485 | B1 | 8/2001 | Siri |
| 9,276,521 | B2 | 3/2016 | Reed et al. |
| 10,148,220 | B2 | 12/2018 | Almy |
| 10,174,970 | B2 | 1/2019 | Grushkowitz |
| 10,389,136 | B2 | 8/2019 | Drees |
| 10,557,646 | B1 | 2/2020 | Ma et al. |
| 10,684,348 | B2 | 6/2020 | Arliaud et al. |
| 10,732,319 | B2 | 8/2020 | Feng |
| 10,819,116 | B2 | 10/2020 | Khabibrakhmanov |
| 11,360,492 | B2 | 6/2022 | Lee et al. |
| 11,500,397 | B2 | 11/2022 | Sharp et al. |
| 11,886,211 | B2 | 1/2024 | Lee et al. |

(Continued)

FOREIGN PATENT DOCUMENTS

| | | |
|---|---|---|
| CN | 102326034 | 1/2012 |
| CN | 103676962 | 3/2014 |

(Continued)

OTHER PUBLICATIONS

Fuentes-Morales, Rosa F.; “Control Alogrithims Applied to Active Solar Tracking Systems: A Review”; Solar Energy 212; Jul. 15, 2020; pp. 203-219.

(Continued)

*Primary Examiner* — Thanh Truc Trinh
(74) *Attorney, Agent, or Firm* — MASCHOFF BRENNAN

(57) ABSTRACT

Embodiments of the present disclosure may provide improvements over existing solar tracking systems by implementing a backtracking process that optimizes irradiance capture while also reducing row-to-row shading. In some embodiments, a “slope-aware” backtracking model accounts for east-west and north-south slopes that are present, as in uneven or hilly terrain.

22 Claims, 7 Drawing Sheets

(56) References Cited

U.S. PATENT DOCUMENTS

| | | | |
|---|---|---|---|
| 2007/0084502 A1 | 4/2007 | Kelly et al. | |
| 2009/0095342 A1 | 4/2009 | Lin et al. | |
| 2010/0018519 A1* | 1/2010 | McDonald ............ | G01S 3/7803 126/573 |
| 2010/0089389 A1 | 4/2010 | Seery et al. | |
| 2010/0198420 A1 | 8/2010 | Rettger et al. | |
| 2011/0290306 A1 | 12/2011 | Roberts | |
| 2013/0257155 A1 | 10/2013 | Judkins | |
| 2015/0073594 A1 | 3/2015 | Trujillo et al. | |
| 2015/0200621 A1 | 7/2015 | Reed et al. | |
| 2017/0353145 A1 | 12/2017 | Yang | |
| 2018/0358921 A1 | 12/2018 | Henderson | |
| 2021/0103302 A1* | 4/2021 | Lee ......................... | F24S 50/20 |
| 2021/0273602 A1 | 9/2021 | Gu et al. | |
| 2022/0399850 A1 | 12/2022 | Hanks et al. | |

FOREIGN PATENT DOCUMENTS

| | | |
|---|---|---|
| CN | 103149947 B | 2/2015 |
| CN | 104460705 | 3/2015 |
| CN | 107923659 | 4/2018 |
| KR | 10-2016-0049764 | 5/2016 |
| WO | 2010003115 | 1/2010 |
| WO | 2016/186225 A1 | 11/2016 |
| WO | 2023043844 A1 | 3/2023 |

OTHER PUBLICATIONS

Nascimento, Bruno et al.; "Backtracking Algorithm for Single-Axis Solar Trackers Installed in a Slopping Field"; Research Article; Journal of Engineering Research and Applications; vol. 5, Issue 12, Part 4, Dec. 2015; pp. 100-103—ISSN 2248-9622.

European Patent Office; International Search Report and Written Opinion issued in corresponding PCT App No. PCT/US2025/058830 dated Apr. 30, 2026; 16 pages.

Zhang Junbin et al: "Error analysis and 1-25 auto correction of hybrid solar tracking system using photo sensors and orientation algorithm", Energy Elsevier, Amsterdam, NL, vol. 182, Jun. 6, 2019 (Jun. 6, 2019), pp. 585-593, XP085736777, ISSN: 0360-5442, DOI: 10.1016/J.ENERGY.2019.06.032.

Rhee Kurt: "Modeling Transposition for 1-25 Single-Axis Trackers Using Terrain-Aware Backtracking Strategies", 2023 IEEE 50th Photovoltaic Specialists Conference (PVSC) IEEE, Jun. 11, 2023 (Jun. 11, 2023), pp. 1-6, XP034504717, DOI: 10.1109/PVSC48320.2023.10360094.

* cited by examiner

LEARNING AXIS-TILT AND CROSS-AXIS SLOPES FOR SLOPE-AWARE BACKTRACKING

CROSS-REFERENCE TO RELATED APPLICATIONS

This patent application claims priority to and the benefit of U.S. Provisional Patent Application Ser. No. 63/729,796, entitled LEARNING AXIS-TILT AND CROSS-AXIS SLOPES FOR SLOPE-AWARE BACKTRACKING, filed Dec. 9, 2024, which is incorporated by reference in its entirety.

TECHNICAL FIELD

The present disclosure generally relates to learning axis-tilt and cross-axis slopes for slope-aware backtracking in single-axis solar tracking systems.

BACKGROUND

Photovoltaic (PV) modules (also known as solar modules, PV panels, or solar panels) contain cells that directly convert solar energy into electrical energy via the photovoltaic effect. Under uniform solar illumination, the power output of a PV module is approximately proportional to the amount of solar energy received over the module surface area per unit time, or solar irradiance, which has units of Watts per meter squared. However, when a part of the module is blocked from the Sun, the loss in power output from the module may be disproportionate to the fraction of the module that is shaded due to the series connections of cells in the module. This phenomenon can impact the operational strategy of PV systems.

PV modules are commonly linked together and arranged in rows to form a PV array. PV modules may be mounted to support structures which fix the direction they are facing at all times or, alternatively, to structures which vary their orientation throughout the day. A solar tracking system, or "tracker", allows the PV modules to face toward the Sun, while also serving as their structural support and anchor to the ground. A single-axis solar tracker contains one rotational axis, which is typically north-south aligned. In these systems, PV modules are clamped to a "torque tube", which rotates the modules in a perpendicular plane and attempts to minimize the angle between the common normal vector to the PV modules and the Sun's direct rays, known as the angle of incidence (AOI). The component of solar irradiance incident on a surface from within a small angular range of the solar position (the Sun's position relative to Earth) is known as direct or "beam" irradiance, which makes up most of the irradiance under clear-sky conditions. In contrast, irradiance from scattered light rays that are incident on the surface from angles outside of this angular range is known as diffuse irradiance. Under clear-sky conditions, tracking the solar position maximizes the PV area exposed to direct irradiance and thus maximizes the irradiance collection potential. Additionally, as the fraction of light that is reflected from the PV module surfaces increases with the angle of incidence, solar tracking minimizes the reflection.

Row-to-row shading is a potential issue in single-axis tracker systems. This is shading due to rows that are closer to the Sun casting shadows on rows that are farther away from the Sun. This is particularly a concern in the early morning and late afternoon when the Sun is near the horizon. At these times, the PV modules are angled steeply to face the Sun. However, because rows cannot be spaced infinitely far apart, their shadows can create partial shading scenarios for PV modules that are farther from the Sun.

As described above, partial shading of a PV module can result in a loss in the power output that is much higher than the fraction of the module that is shaded. This is because, in crystalline silicon PV modules, many cells are connected in series such that unshaded cells are forced to carry the same current as shaded cells. In conventional "full cell" crystalline PV modules, one string connects all cells in series such that when only one row of cells is completely shaded, the power output drops to zero. "Half-cell" modules mitigate the issue by dividing the module into two parallel connected strings such that when one row of cells is shaded, the power output is only reduced by half.

Backtracking is a strategy employed in single-axis tracker systems with crystalline silicon PV modules to avoid row-to-row shading. Backtracking positions the PV modules at shallower angles than the normal tracking angles in the early AM and late PM hours when the Sun is near the horizon. The rotational motion of backtracking is opposite to that of normal tracking, so the modules are said to track backwards or "backtrack". The typical goal of backtracking is to correct the normal tracking angle by the smallest angle possible to avoid rows shading each other. It should be noted that backtracking results in higher reflectance losses due to less favorable AOIs with the beam irradiance. However, these additional losses are generally deemed less than the "electrical mismatch" losses associated with partial shading of modules, so backtracking is a widely adopted strategy in single-axis tracker systems.

The backtracking correction angle can be calculated from a consideration of the solar position and the tracker geometry. A central challenge to these calculations is obtaining accurate values for the geometrical parameters used in the backtracking model. For example, the PV site may have a predominant east-west or north-south slope. Or it may be desirable to avoid disturbing the topsoil when installing the tracker, which may result in rolling or undulating terrain beneath the tracker rows. However, slope/undulations may not be measured with sufficient accuracy to avoid shading when used in a backtracking model. Common errors made in the positioning of piles (support beams) used in single-axis trackers also create row-height differences that may not be known post-construction.

The present disclosure provides a procedure that can be used to determine, or "learn", the slope parameters as used in a slope-aware backtracking model. The approach does not rely on direct topographic measurements of the PV site and hence avoids the use of specialized topographic measurements or equipment.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

A slope-aware backtracking model may include parameters describing the terrain slope in directions parallel and perpendicular to the tracker rotational axis (or tracker axis), which may be referred to as the "axis-tilt slope" and "cross-axis slope", respectively. Embodiments of the present disclosure may provide improvements over existing single-axis solar tracking systems by incorporating a procedure for determining, or "learning", the axis-tilt slope and cross-axis slope parameters.

During a backtracking learning procedure, PV modules are held at specific angles at specific intervals of day. In the morning, initially moving the modules to the specific angles causes shade to form on all rows, and the PV modules are then held in these positions for some time until the Sun position changes to allow the shading to clear. In the afternoon, the PV modules are held in another set of positions, until the Sun position changes to allow the shade to form on all rows. The power data may be evaluated to detect shade-clearing and shade-forming events, which identify points along a backtracking curve. A model may then be used to calculate backtracking curves for the learning day, or any other day. This method contemplates the determination of only one unknown parameter.

In the present disclosure, backtracking learning is carried out at more than one time of year to enable learning of both the axis-tilt slope and cross-axis tilt slope parameters. Alternatively, both parameters may be learned using multiple learning angles within the same learning "period". This may produce backtracking curves that are better able to avoid shade on PV modules, especially for single-axis tracker systems installed on significant east-west and north-south slopes.

In the disclosed embodiments, a learning period may comprise a series of dates, depending on the weather as well as factors that can impact the quality of the power or tracker data collected. For example, the timespan may be as short as one or two days if the weather is clear and the PV power output has the expected response to shade-forming and shade-clearing events. However, the learning period may be as long as two weeks or more due to clouds (which can block the beam irradiance and reduce the effectiveness of the learning moves at creating row-to-row shading) or due to issues with the data collection system or inverters (which can create gaps or unexpected variations in the power data).

Backtracking learning may be conducted at different times of the year to enhance the sensitivity to one of the slope parameters relative to the other. The timespan of the learning period notwithstanding, example learning dates may include Spring Equinox and Summer Solstice, or any dates for which the daily solar path is significantly different.

Similarly, backtracking learning may be carried out with multiple learning angles to take advantage of different sensitivity to the slope parameters at different times of day. For example, learning angles in the morning include −20 degrees and −45 degrees, which may be selected based on their relative sensitivity to the slope parameters as well as other criteria, such as the strength of the power signal.

In some embodiments, separate parameters may be determined for morning and afternoon backtracking. This may allow for greater flexibility in fitting learning data with the model, accounting for "noise" in the data or for a model that does not capture the fully complexity of the problem.

In other embodiments, one of the slope parameters may be learned after a first learning period, assuming a value of zero for the other parameter. This parameter may be used in the slope-aware backtracking model until the second learning period is conducted, allowing for solution of both parameters simultaneously. This approach may allow the trackers to operate with backtracking curves that reduce row-to-row shading relative to a generic (or slope-unaware) backtracking model.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1:
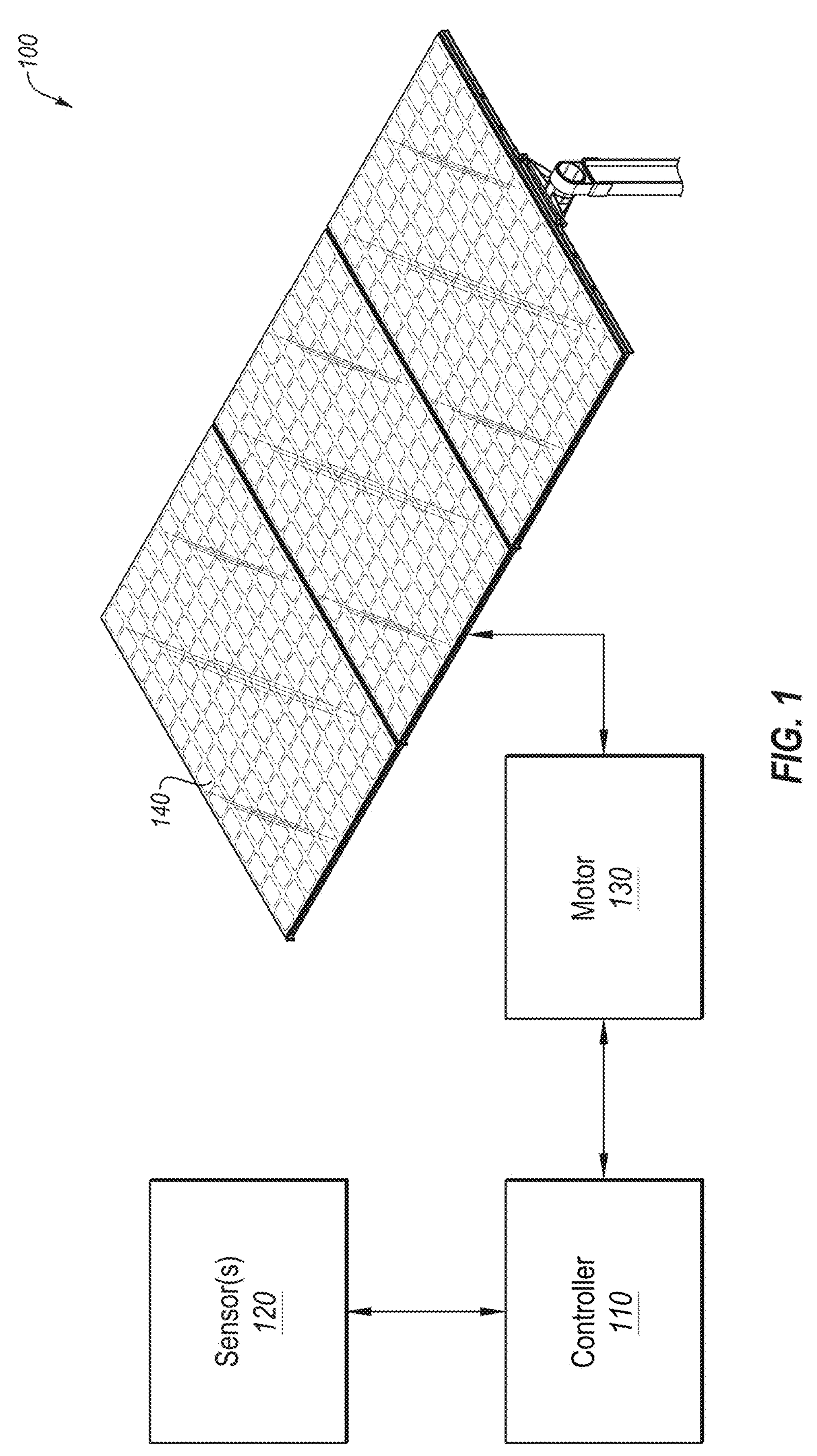
FIG. 1 illustrates an example solar tracking system.

Disclosed embodiments are directed to methods for operating a solar tracking system in a manner that avoids, decreases, and/or minimizes shading, such as row-to-row shading. One example of a solar tracking system can be found in U.S. Pat. No. 11,360,492 entitled "Solar Tracking System" (the "'492 patent"), the entire content of which is incorporated herein by reference.

As noted, backtracking is a tracking strategy used to avoid row-to-row shading on photovoltaic (PV) modules, particularly during the early morning and late afternoon hours when the Sun is low in the sky. As described in the '492 patent, a "learning" method can be used to determine such backtracking curves. According to this learning method, an "initial" backtracking curve is first identified for a specific day on which rows of trackers are intentionally moved to a set of angles at specific times of the day. The rows of trackers are held at a set of these angles during some period in the morning until the modules come completely out of the shade as the Sun rises. The rows of trackers are held at another set of angles during some period in the afternoon until the modules go into shade as the sun falls. Power data may be evaluated to determine the time of day or solar position (or solar zenith angle) at which the panels came out of shade in the morning and went into shade in the afternoon, and this data may be used to identify points on an initial backtracking curve, or the backtracking curve for the day on which the learning method was implemented. The learning results can then be extrapolated based on a model to determine backtracking curves for other days during the year.

The '492 patent contemplates a method that can learn either the axis-tilt slope parameter or the cross-axis slope parameter in a slope-aware backtracking model. Typical tracker axes are north-south aligned such that axis-tilt slope aligns with the north-south ground slope, while the cross-axis slope aligns with the east-west ground slope.

In one embodiment disclosed by the '492 patent, a learning method for morning backtracking can be briefly outlined in the following steps: (1) rotate the PV modules to an angle that causes rows to shade each other; (2) hold the PV modules at this angle (learning angle) as the solar position changes to allow the shade to clear; (3) monitor the power output of the PV modules and detect maximum curvature points (or "knees") with respect to the projected solar zenith (PSZ), indicating the clearing of shade; (4) aggregate the knees in a histogram (or equivalent) to observe a peak in the histogram; and (5) insert the histogram peak, or "winning" PSZ, along with the learning angle, in a model to calculate backtracking curves. This method requires identification of at least one actual point on a backtracking curve, or a known point where PV modules transition from a state of partial shading to a state of full Sun exposure. For afternoon backtracking, the order of shade and shade clearing is reversed relative to morning. Additional backtracking learning method details and exemplary uses in a tracker control algorithm can be found in the '492 patent.

According to example embodiments of the present disclosure, (a) multiple learning periods with a single learning angle or (b) multiple learning angles with a single learning period may be conducted to learn the axis-tilt slope and the cross-axis slope parameters. Using both parameters in a slope-aware backtracking model may allow for more accurate calculation of the backtracking curves, increasing shade-avoidance for trackers installed on arbitrarily sloped or undulating terrain.

A single learning period may consist of a day, or up to two weeks, or more, depending on the weather and data quality. Factors that can affect the length of a learning period include passing clouds or issues with the power data during the backtracking hours, for example. As little as one day may be required for a successful learning period if the weather is clear and the power data are high quality. Additional days may be required due to passing clouds, issues with inverters, etc., which may prevent an accurate knee determination.

In one example embodiment, backtracking learning is carried out at two (or more) different times of the year to take advantage of seasonal variations in the solar path. The time of year of the learning can affect the sensitivity of the learning to the slope parameters. The learning periods can be planned to allow for increased or decreased sensitivity to one of the parameters relative to the other.

In another example embodiment, an effective value of one of the slope parameters may be determined after a first learning period, assuming a value of zero for the other parameter. The backtracking curves may be calculated using the effective parameter in the slope-aware model until the second learning period. This may provide some backtracking performance improvement relative to a slope-unaware model for the time between learning periods.

In an additional embodiment, slope parameters may be calculated separately for the morning and afternoon backtracking hours, doubling the number of model parameters and potentially allowing for better fits to the learning data.

FIG. 1 illustrates an example solar tracking system 100, in accordance with one or more embodiments of the present disclosure. As illustrated in FIG. 1, the solar tracking system 100 may include a controller 110 in communication with a sensor 120 and a motor 130. The motor 130 may control the orientation of one or more solar panels, one or more rows of solar panels, and the like. In FIG. 1, an example row of solar panels 140 is illustrated for convenience. The controller 110 may be configured to provide guidance to the motor 130 as to the orientation (or tilt angle) of the solar panels 140.

In some embodiments, the controller 110 may receive data from the sensor 120 related to performance of the solar panels 140. For example, the data from the sensor 120 may include irradiance data, electrical current, voltage, or power being generated by the solar panels 140. The sensor 120 may include or consist of a component that is already part of the infrastructure of a solar tracking system 100 without adding additional hardware. For example, the sensor 120 may simply listen in or monitor the amount of current being generated at an inverter associated with the solar panels 140. Alternatively, the sensor 120 may include any component able to sense, monitor, meter, or otherwise measure irradiance and/or electrical output and thus sense or help determine if the electricity generated by the solar panels 140, or a portion of the solar panels such as a row of solar panels, has decreased.

In normal operation, the motor 130 may facilitate tracking the position of the Sun with the solar panels 140 such that the solar panels 140 may be generally oriented as normal as possible to the Sun, which may result in increased electrical energy generation. As discussed, the angling of solar panels to minimize AOI may cause shading of solar panels positioned behind an angled solar panel depending on the position of the Sun, and potentially on the topography of the solar installation. As is known, the solar tracking system 100 may deviate from the normal tracking orientation by use of "backtracking" techniques. However, it is also important to address shading situations that can arise from the topography of the installation-such as might be the case when there exists north-south terrain slope, causing the tracker to be on an incline, which might exacerbate shading of one or more downhill solar panels. For example, the solar tracking system 100 may operate according to a process in which the orientations may be adjusted to reduce shading of solar panels, such as shading between adjacent rows of solar panels 140 (such as is disclosed in the '492 patent referenced herein), and to also account for shading that may occur due to the topography by assessing and accounting for the terrain slope. In some embodiments, adjustment of the orientation of solar panels may be accomplished in accordance with a slope-aware backtracking model that takes into account east-west and north-south terrain slopes. This allows trackers to maintain the optimal tilt angle of solar panels and avoid or minimize shading, regardless of the time of year.

Figure 2A:
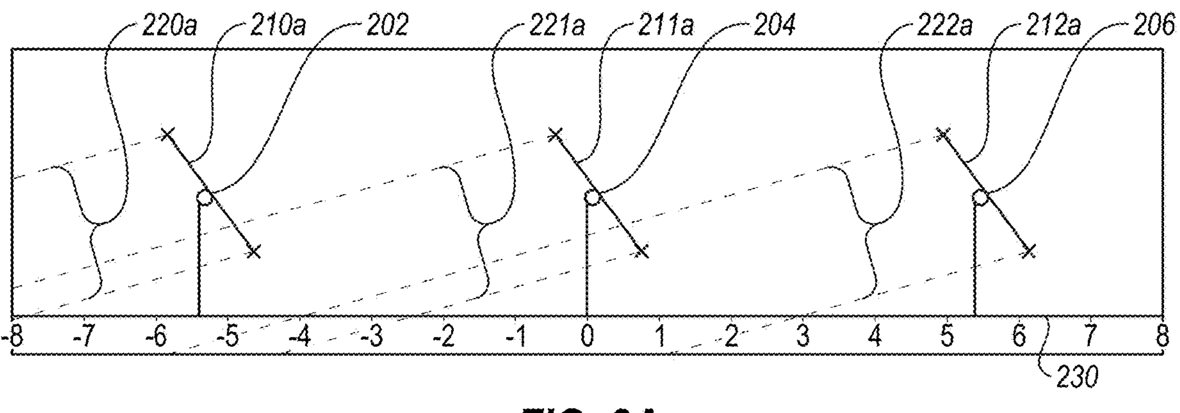
FIGS. 2A-2D illustrate example views of one or more rows of solar panels on terrain that is not level.

FIGS. 2A-2D illustrate examples of shading that may result due to tilt angles of adjacent panels and terrain slope. As illustrated in FIG. 2A, solar panels associated with the row 21$\theta_a$ may cast a shadow 22$\theta_a$, panels associated with the row 211*a* may cast a shadow 221*a*, and the panels associated with the row 212*a* may cast a shadow 222*a*. The rows may be mounted on the ground 230 via torque tubes 202, 204, and 206 of a solar tracker device. The torque tubes 202, 204, and 206 may define the axis of rotation of the row 21$\theta_a$, 211*a*, and 212*a*, respectively. When operating with a typical tracking algorithm and orienting the panels of rows 21$\theta_a$, 211*a*, and 212*a* to face the Sun near the horizon, the shadow 222*a* may at least partially cover the panels associated with row 211*a* and the shadow 221*a* may at least partially cover the panels associated with row 21$\theta_a$, decreasing PV production by those specific panels.

Figure 2B:
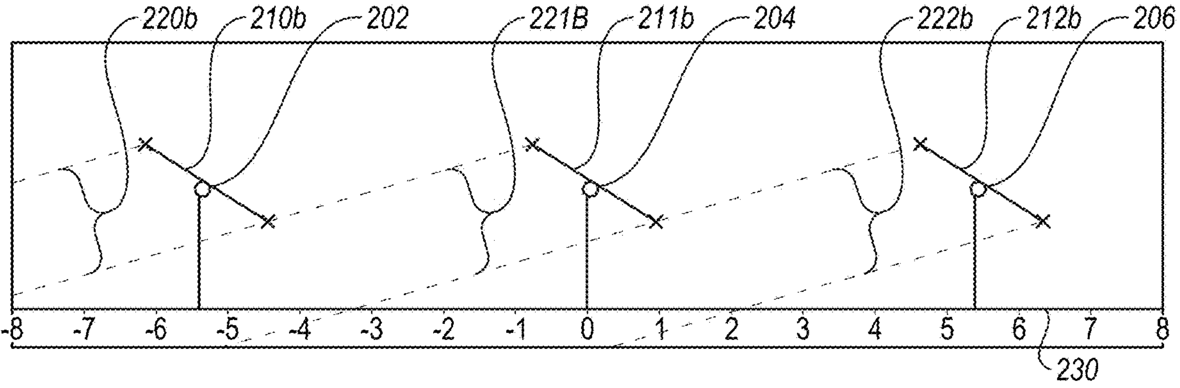

As illustrated in FIG. 2B, in an ideal scenario with perfectly known spacing between the rows 21$\theta_b$, 211*b*, and 212*b* and the ground 230 perfectly flat, the orientation may be solved in which the shadow 222*b* of the row 212*b* may come right to the edge of the row 211*b* without covering the row 211*b*, and the shadow 221*b* of the row 211*b* may come right to the edge of the row 21$\theta_b$ without covering the row 21$\theta_b$. In this way, the tilt angle is such that AOI is optimized but to a degree that does not shade adjacent panels.

Figure 2C:
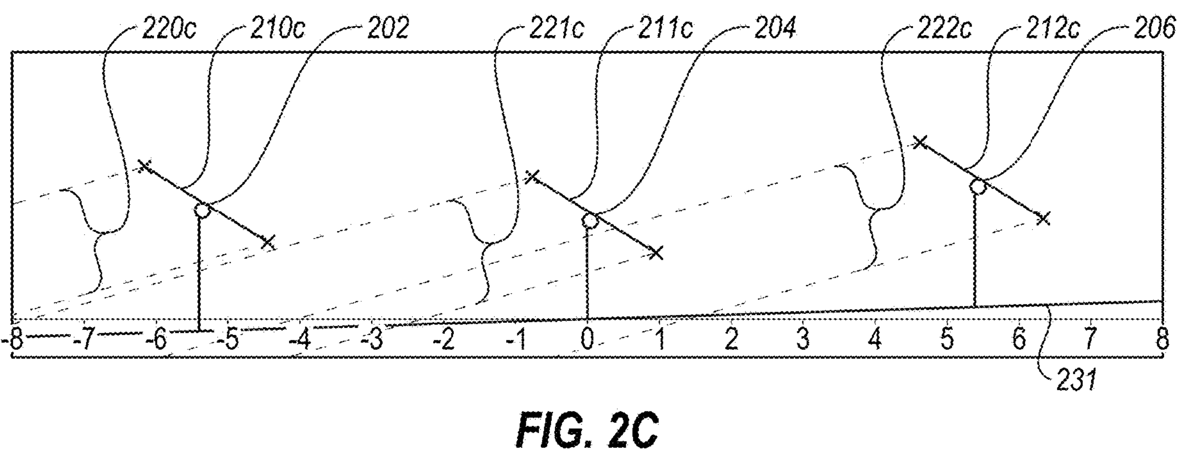

FIG. 2C illustrates an example where the ground 231 is not perfectly flat, or where the rows have different heights in an east-west direction. As is shown, in this situation even if using the solved-for orientation of FIG. 2B, the shadow 222*c* may cover at least a portion of the panels associated with row 211*c*, and/or the panels associated with row 211*c* may be tilted off of an ideal position, which may cause a loss of potential energy generation due, for example, to the solar panel having a less favorable AOI to the Sun.

Figure 2D:
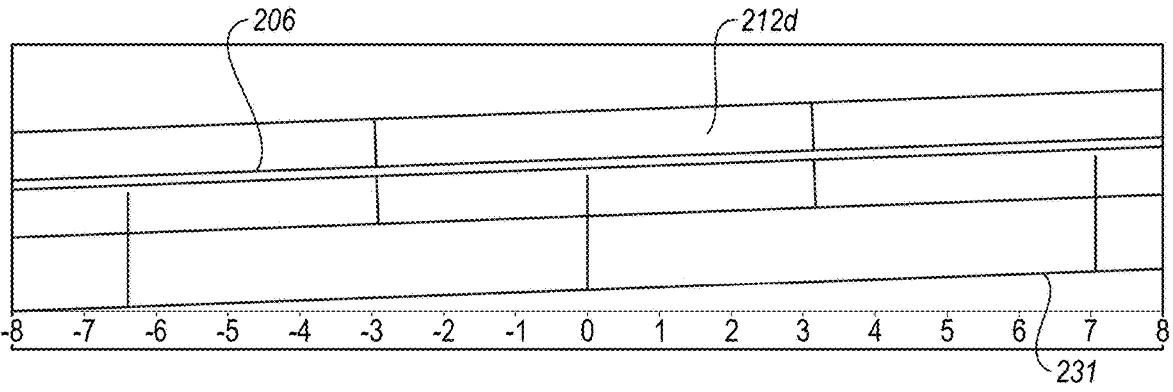

A further condition might exacerbate the shading problem when the ground 231 is not perfectly flat in the north-south direction. This is shown in FIG. 2D, where the north-south slope in the ground 231 creates some inclination in the row 212*d*. The inclination in the row 212*d* can be seen in the torque tube 206, which is substantially parallel to the angle of the ground 231. As noted above, a backtracking model may be "slope-aware", including axis-tilt slope and cross-axis slope parameters describing the ground slope in directions parallel and perpendicular to the tracker rotational axis (or tracker axis), respectively. In typical single-axis tracker installations, the tracker axis is north-south aligned, so the axis-tilt slope is equivalent to north-south slope and the cross-axis slope is equivalent to east-west slope.

A practical challenge with implementing a slope-aware backtracking model is that the slope parameters may be unknown or not quantified with sufficient accuracy to reduce row-to-row shading. For example, topographic data is often used in the initial tracker design; however, this data may become inaccurate after construction due to unanticipated grading operations or due to errors in the placement of piles (tracker support structures). Specialized techniques and equipment have been discussed for obtaining the slope parameters—for example, LiDAR and photogrammetry techniques or pile driving equipment that can accurately record the locations of piles during construction. However, these may not be accessible or cost-effective for every PV site.

In the present disclosure, the slope parameters are obtained via an approach that does not rely on direct measurements of the site topography and does not require specialized equipment beyond what already exists on all standard PV sites.

Generic or "Slope-Unaware" Backtracking Model

The tracker angle (R) during backtracking periods is typically calculated by subtracting a correction (ΔR) from $\theta_{PSZ}$:

$$R = \theta_{PSZ} - \Delta R$$

Here, PSZ stands for the projected-solar zenith angle, which creates the minimum AOI between the PV modules and the beam irradiance.

In the generic, or "slope-unaware" model, ΔR is simply determined from the geometrical relationship between the "pitch" (P) or row spacing, the module length in the cross-axis direction ($L_m$), and $\theta_{PSZ}$:

$$\Delta R = \mathrm{sgn}\theta_{PSZ}\cos^{-1}\left(\frac{P}{L_m}\cos\theta_{PSZ}\right)$$

In this equation, sgn is the mathematical sign function (not sin), which has the following property:

$$\mathrm{sgn}\theta_{PSZ} = -1 \text{ when } \theta_{PSZ} < 0, \text{ and } \mathrm{sgn}\theta_{PSZ} = +1 \text{ when } \mathrm{sgn}\theta_{PSZ} \geq 0.$$

Importantly, this generic backtracking model does not consider terrain or construction tolerances (for example, as shown in FIGS. 2A and 2B). Thus, if used to calculate backtracking curves for sites on sloped or undulating terrain, and with common construction defects, the generic backtracking model will result in row-to-row shading.

Slope-Aware Backtracking Model

The slope-aware backtracking model considers a tracker with slope components parallel and perpendicular to the tracker axis. Derivations of the slope-aware backtracking model exist and can be found, for example, in Anderson and Mikofski, "Slope-Aware Backtracking for Single-Axis Trackers", 2020. The backtracking correction angle may be expressed as:

$$\Delta R = \mathrm{sgn}\theta_{PSZ}\cos^{-1}\left\{\frac{P}{L_m}\cdot(\cos\theta_{PSZ} - m_{lim}\sin\theta_{PSZ})\right\}$$

Here, $m_{lim}$ is the "limiting" cross-axis slope—a parameter which encompasses the cross-axis slope (m) as well as row-height differences created by construction tolerance ($\Delta H_{max}$):

$$m_{lim} = m + \mathrm{sgn}\theta_{PSZ}\frac{\Delta H_{max}}{P}$$

In some contexts, it may be preferable to work with an equivalent row-height difference, instead of $m_{lim}$, given by $$\Delta H = \frac{P m_{lim}}{\mathrm{sgn}\theta_{PSZ}}$$

For reference, ΔH is positive if the slope is uphill when facing toward the Sun, and ΔH is negative if the slope is downhill when facing toward the Sun. Also, note that the axis-tilt slope is incorporated in these equations through the $\theta_{PSZ}$, as will be shown below.

Based on the results of one learning period, with one learning angle, it is not possible to solve for both the axis-tilt slope and the cross-axis slope. However, it is possible to solve for one unknown parameter if the other is assumed to be zero. The steps to do this may include: (1) substitute the slope-aware form of ΔR into the equation for R ($R=\theta_{PSZ}-\Delta R$); (2) insert the peak or "winning" PSZ for $\theta_{PSZ}$ and the learning angle for R; (3) solve the resulting equation for the unknown parameter.

Figure 3A:
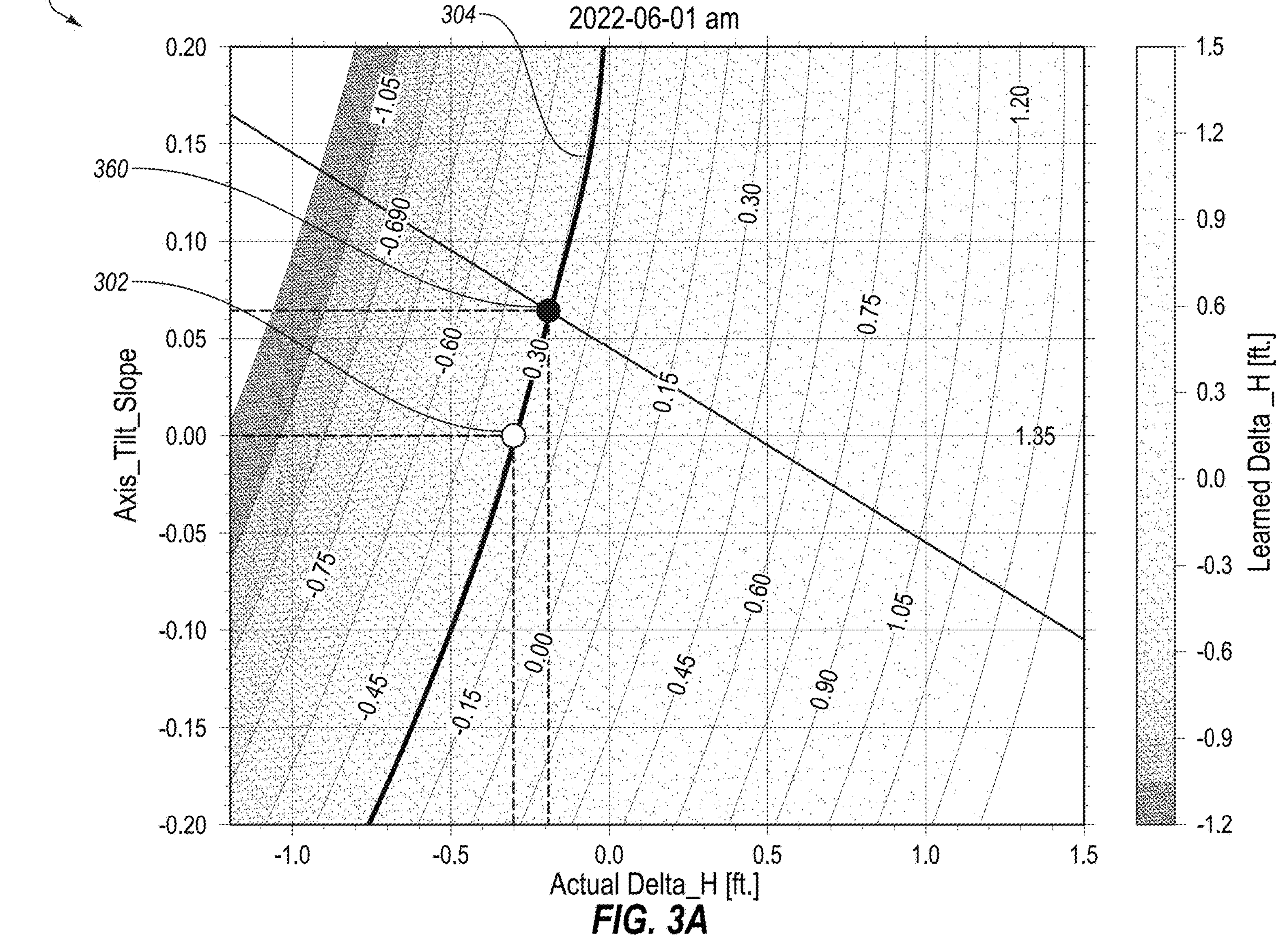
FIGS. 3A and 3B illustrate graphs that plot contour lines of effective values of row-to-row height differences against actual values of row-to-row height differences and axis-tilt slope.
Figure 3B:
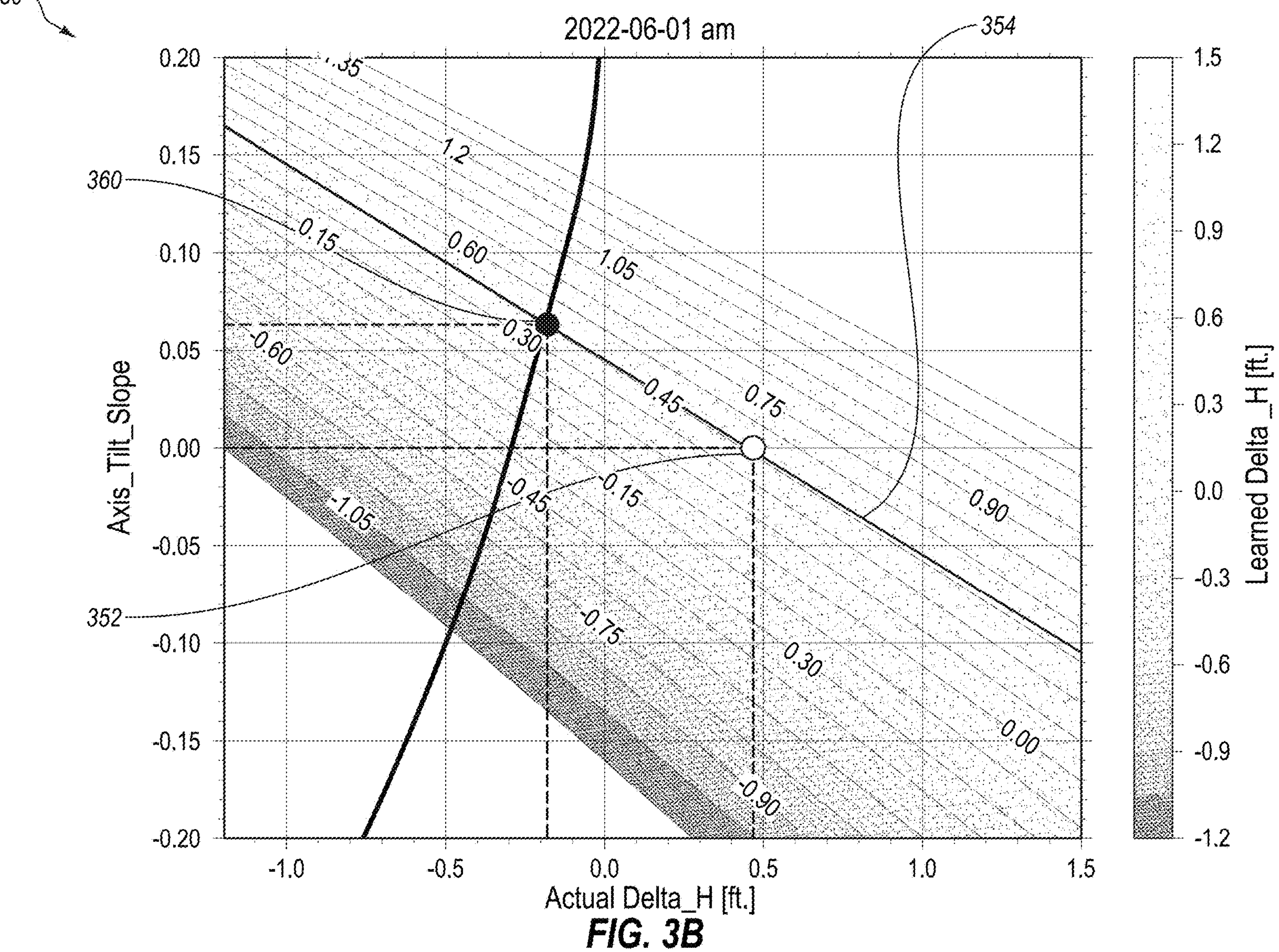

Solving for either parameter this way results in an "effective" parameter value that may differ from the "actual" parameter value. This is illustrated in FIGS. 3A and 3B, in which contour lines plot effective values for ΔH ($\Delta H_{eff}$) against the "actual" values of ΔH and axis-tilt slope ($\tan\theta_{at}$) indicated on the x- and y-axes of the graph, respectively. This graph may be interpreted with an example.

Consider a first learning period 300 represented by a date June 1$^{st}$ in FIG. 3A (which may be any of the dates within the date range of the first learning period). Any solution for $\Delta H_{eff}$ based on this learning period, must correspond to a point on the axis-tilt slope equals zero line, as that was the original assumption; for instance, $\Delta H_{eff}$=−0.3 ft. corresponds to the point 302. However, according to the slope-aware model, the solution for $\Delta H_{eff}$ is consistent with any combination of ΔH and axis-tilt slope values along the $\Delta H_{eff}$=−0.3 ft. contour line, 304.

Now, consider a second learning period 350 represented by a date November 19th in FIG. 3B, (which may also be any of the dates within the range of the second learning period). The point 352 corresponds to the $\Delta H_{eff}$ value learned from this period, +0.5 ft. This time, the solution for $\Delta H_{eff}$ is consistent with any combination of ΔH and axis-tilt slope values along the $\Delta H_{eff}$=+0.5 ft. contour line, 354.

Finally, considering both learning periods together, the intersection of the contour lines 304 and 354, indicated with the point 360, defines a unique combination of ΔH and axis-tilt slope values: ΔH=−0.2 ft and $\tan\theta_{at}$=0.06 ft. These are the "actual" values that have been determined from two learning periods.

FIG. 3A also shows how the time of year of the learning period affects the sensitivity to the slope parameters. For example, the contour lines in FIG. 3A are nearly vertical, indicating that particular solution for $\Delta H_{eff}$ narrows the range of the potential solutions for ΔH much more than it does for $\tan\theta_{at}$. This indicates high sensitivity to ΔH and low sensitivity to axis-tilt slope around June 1st. On the other hand, the slope of the contour lines in FIG. 3B indicates relatively high sensitivity to the axis-tilt slope, and still good sensitivity to ΔH, around November 19th Procedure for Obtaining Axis-Tilt Slope and Cross-Axis Slope from Multiple Learning Periods and a Single Learning Angle In the following, only two learning periods are considered; however, the procedure can be extended to consider more than two learning periods using standard regression algorithms. The following procedure is based on the premise that, according to the backtracking model, the knee PSZ should be independent of the time of year that learning was conducted. Another way of viewing this is that if two learning periods are conducted, and an effective $\Delta H_{eff}$ is determined after each, the axis-tilt slope dependence is ignored. Then, the difference between "winning" knee PSZs from two different learning periods is attributed to the axis-tilt slope being nonzero.

In each learning period, a date representing the winning PSZ from the histogram is selected; the date selected may generally have the same PSZ as the peak PSZ in the histogram, but it may have a different PSZ value. As noted above, a single learning period may include only one day or a number of days up to approximately two weeks or more, depending on the weather and quality of the learning data. Factors that can add to the duration of the learning period are inverter issues and cloudy weather, to name a couple. After the representative date is selected for each learning period, the data are reanalyzed to locate the timestamp or instant in time at which the knee PSZ occurred.

Figure 4A:
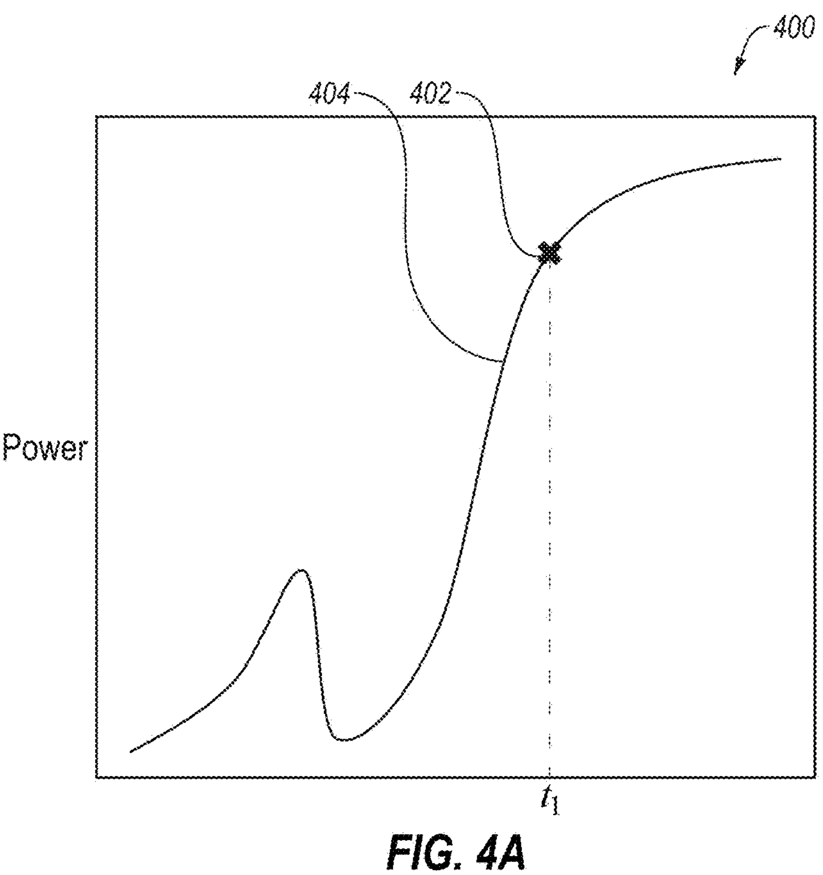
FIGS. 4A and 4B illustrate graphs that illustrate first and second sets of backtracking parameters collected according to one or more embodiments of the present disclosure.
Figure 4B:
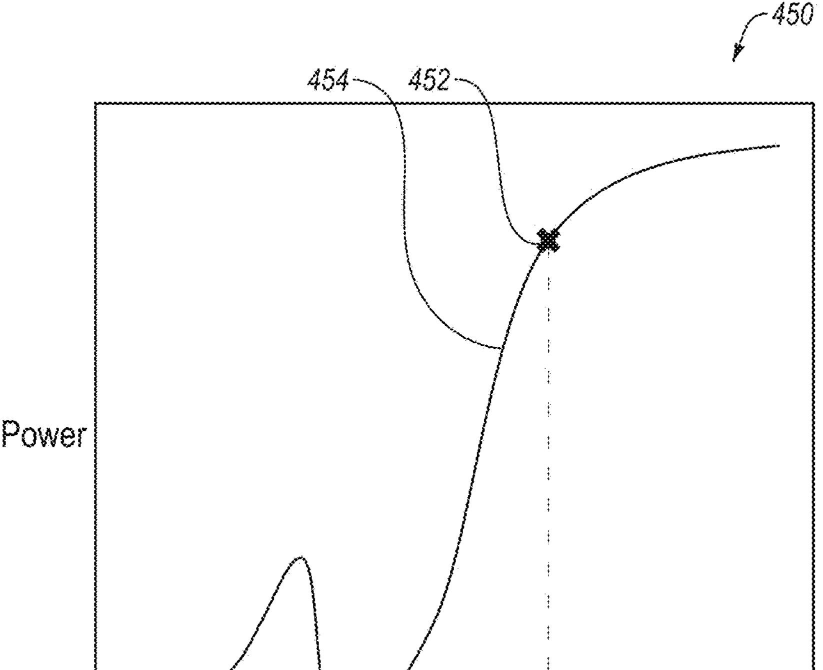

FIG. 4A illustrates a first learning period 400 in which a first knee 402 is identified at a time $t_1$ (or knee timestamp $t_1$) in the power data collected during learning. The first knee 402 identifies a point where PV modules transition from a state of shade due to row-to-row shading to a state of full Sun exposure. FIG. 4B illustrates a second learning period 450 in which a second knee 452 is identified at a time $t_2$ (or knee timestamp $t_2$). The second knee 452 also identifies a point where PV modules transition from a state of shade due to row-to-row shading to a state of full Sun exposure.

The first and second learning periods 400 and 450 may be performed at different times of the year. In disclosed embodiments, the first learning period 400 may be offset from the second learning period 450 of time by a length of time that allows the Sun's path to appreciably change between the first learning period 400 and the second learning period 450. For example, the first learning period 400 may be offset from the second learning period 450 by one or more seasons, which may correspond to one month, two months, three months, four months, five months, six months, seven months, eight months, nine months, or any other lengths of time.

In some embodiments, the data collection period on any given day may be specific to the solar site. Solar sites in geographical locations that experience shorter or longer days may collect backtracking data over a shorter or longer duration of time, respectively. Alternatively, backtracking data may be collected over an entire day (e.g., a twenty-four-hour period). For example, a first backtracking process and/or a second backtracking process may be performed over 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, or any other durations of time.

Once the knee timestamps $t_1$ and $t_2$ are identified in the first and second learning periods 400 and 450, solar azimuth ($\theta_{azimuth}$) and solar zenith ($\theta_{zenith}$) angles for the timestamps $t_1$ and $t_2$ may be calculated using established algorithms. The National Renewable Energy Laboratory's solar position algorithm ("SPA") as described in Reda and Andreas, "Solar Position Algorithm for Solar Radiation Applications", 2003 or the Sandia National Laboratories' Ephemeris algorithm as described in Hughes, *Engineering Astronomy,* 1985 are examples of algorithms that may be used to determine $\theta_{azimuth\_1}$ and $\theta_{zenith\_1}$ for the knee timestamp $t_1$ and $\theta_{azimuth\_2}$ and $\theta_{zenith\_2}$ for the knee timestamp $t_2$.

An equation can be derived that allows for the solution of the axis-tilt slope based on the two solar positions. Note that the equation uses the same formalism as the derivation for the projected solar zenith angle, $\theta_{PSZ}$. The first step is to transform the solar position angles from spherical coordinates to cartesian coordinates:

$$S_x = \sin\theta_{zenith}\sin\theta_{azimuth}$$

$$S_y = \sin\theta_{zenith}\cos\theta_{azimuth}$$

$$S_z = \cos\theta_{zenith}$$

In this coordinate system, the positive x-axis points horizontally to the east, the positive y-axis points horizontally to the north, and the positive z-axis points vertically.

The next step is to rotate the coordinates ($S_x$, $S_y$, $S_z$) into the tracker reference frame. The y-axis in the tracker reference frame is the tracker rotation axis, which is typically aligned north-south. Deviations from north-south can be accounted for with the axis-azimuth angle ($\theta_{aa}$), defined as the clockwise rotation angle from north (range: 0 degrees to 360 degrees). After applying the axis-azimuth rotation about the z-axis, the solar position coordinates are:

$$S_{x\_aa} = S_x\cos\theta_{aa} - S_y\sin\theta_{aa}$$

$$S_{y\_aa} = S_x\sin\theta_{aa} + S_y\cos\theta_{aa}$$

$$S_{z\_aa} = S_z$$

Similarly, a rotation can be applied about the x-axis to account for the axis-tilt angle ($\theta_{at}$), or the deviation of the tracker axis from horizontal (positive if the southmost end of the tracker is higher than the northmost end and vice versa). The solar position coordinates become:

$$S_{x\_at} = S_{x\_aa}$$

$$S_{y\_at} = S_{y\_aa}\cos\theta_{at} - S_{z\_aa}\sin\theta_{at}$$

$$S_{z\_at} = S_{y\_aa}\sin\theta_{at} + S_{z\_aa}\cos\theta_{at}$$

Finally, the projected solar zenith angle, $\theta_{PSZ}$, is determined from the arctangent of the ratio of the x- and z-components:

$$\theta_{PSZ} = \text{atan2}(-S_{x\_at}, S_{z\_at})$$

Since the PSZ at the knee is independent of the time of year, two expressions for $\theta_{PSZ}$ can be set equal to each other:

$$\text{atan2}(-S_{x\_at\_1}, S_{z\_at\_1}) = \text{atan2}(-S_{x\_at\_2}, S_{z\_at\_2})$$

where the subscripts 1 and 2 indicate the learning period.

Making appropriate substitutions and solving for $\theta_{at}$ results in the equation:

$$\theta_{at} = \tan^{-1}\left(\frac{S_{x\_aa\_2}S_{z\_aa\_1} - S_{x,aa\_1}S_{z\_aa\_2}}{S_{x\_aa\_1}S_{y\_aa\_2} - S_{x,aa\_2}S_{y\_aa\_1}}\right)$$

which is solved for $\theta_{at}$ based on the solar position coordinates for the two learning periods.

Then, the $\theta_{PSZ}$ at the knee is calculated using the solar position coordinates for either learning period:

$$\theta_{PSZ} = \text{atan2}(-S_{x\_at\_1}, S_{z\_at\_1}) = \text{atan2}(-S_{x\_at\_2}, S_{z\_\text{at}\_2})$$

Finally, the following steps are repeated: (1) substitute the slope-aware form of ΔR into the equation for R ($R=\theta_{PSZ}-\Delta R$); (2) insert the peak or "winning" PSZ for $\theta_{PSZ}$ and the learning angle for R; (3) solve the resulting equation for $m_{lim}$ or ΔH.

Figure 5:
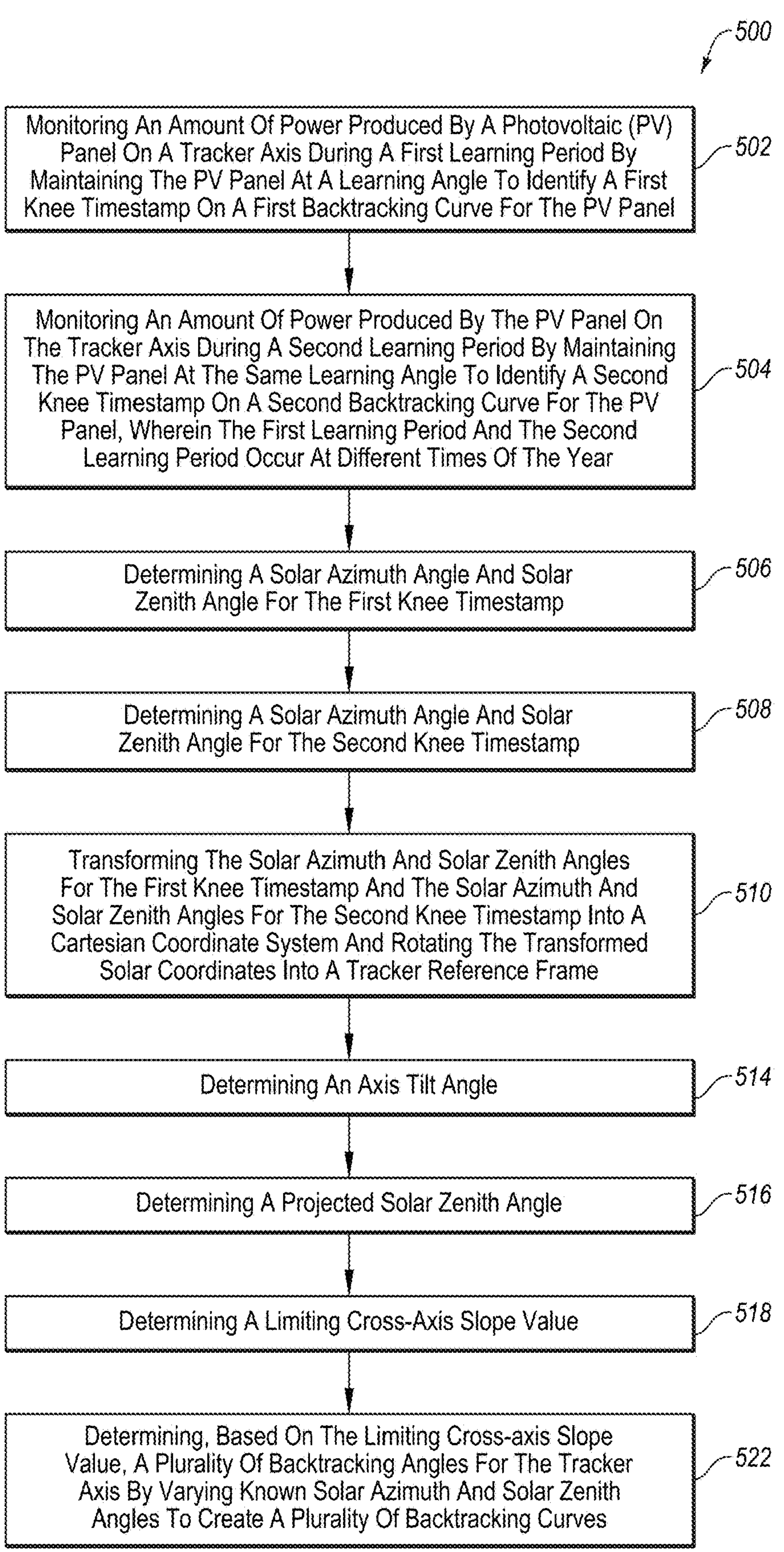
FIG. 5 illustrates an example flow diagram of a method of controlling backtracking of a solar panel system using a set of three-dimensional backtracking parameters, in accordance with one or more embodiments of the present disclosure.

FIG. 5 illustrates an example flow diagram of a procedure 500 learning the axis-tilt slope and cross-axis slope parameters in a slope-aware backtracking model, in accordance with one or more embodiments of the present disclosure. One or more operations of the method 500 may be performed by a system or device, or combinations thereof, such as the system 100 of FIG. 1. Although illustrated as discrete steps, various steps of the method 500 may be divided into additional steps, combined into fewer steps, or eliminated, depending on the desired implementation.

The method 500 may include, at step 502, monitoring an amount of power produced by a photovoltaic (PV) panel on a tracker axis during a first learning period by maintaining the PV panel at a learning angle to identify a first knee timestamp on a first backtracking curve for the PV panel. The method 500 may include, at step 504, monitoring an amount of power produced by the PV panel on the tracker axis during a second learning period by maintaining the PV panel at the same learning angle to identify a second knee timestamp on a second backtracking curve for the PV panel, wherein the first learning period and the second learning period occur at different times of the year.

Each of the first and second knee timestamps may identify a time associated with a point on a backtracking curve where the PV panel is not shaded by any adjacent panels. The first and second learning periods may be separated by any amount of time, including hours, days, weeks, months, seasons, etc.

The method 500 may include, at step 506, determining a solar azimuth angle and solar zenith angle for the first knee timestamp. The method 500 may include, at step 508, determining a solar azimuth angle and solar zenith angle for the second knee timestamp. Equations exist to determine these angles, examples of which are provided herein.

The method 500 may include, at step 510, transforming the solar azimuth and solar zenith angles for the first knee timestamp and the solar azimuth and solar zenith angles for the second knee timestamp into a cartesian coordinate system and rotating the transformed solar coordinates into a tracker reference frame. The coordinates may require a rotation in order to align with the tracker reference frame. The y-axis in the tracker reference frame is the tracker rotation axis, which is typically aligned north-south. Deviations from north-south can be accounted for with the axis-azimuth angle, which is a clockwise rotation angle from north. Equations to perform these rotations are provided herein above.

Additionally, a rotation may be necessary to account for an axis-tilt or a deviation of the tracker axis from horizontal. In some embodiments, the deviation may be positive if the southmost end of the tracker is higher than the northmost end and negative if the southmost end of the tracker is lower than the northmost end. In other embodiments, these designations may be switched.

The method 500 may include, at step 514, determining the axis-tilt angle. The axis-tilt angle can be determined using the solar position coordinates for the two learning periods and assuming that the knee PSZ is independent of the time of year of the learning. Equations to determine the axis-tilt angle are provided herein above.

The method 500 may include, at step 516, determining a projected solar zenith angle. This angle may be determined from the arctangent of the ratio of the x and z components.

The method 500 may include, at step 518, determining a limiting cross-axis slope value. This may be accomplished by (1) substituting the slope-aware form of ΔR into the equation for R ($R=\theta_{PSZ}-\Delta R$), (2) inserting the peak or "winning" PSZ for $\theta_{PSZ}$ and the learning angle for R, and (3) solving the resulting equation for $m_{lim}$ or ΔH.

Once a limiting cross-axis slope value has been calculated, it can be used in step 522, to determining, based on the limiting cross-axis slope value, a plurality of backtracking angles for the tracker axis by varying known solar azimuth and solar zenith angles to create a plurality of backtracking curves. For example, backtracking curves can be determined for any day of the year that take into account both an east-west slope as well as a north-south slope, thus providing more accurate backtracking curves such that the PV panels avoid shading more efficiently during the year.

Modifications, additions, or omissions may be made to the method 500 without departing from the scope of the disclosure. For example, the operations of the method 500 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Procedure for Obtaining Axis-Tilt Slope and Cross-Axis Slope from Multiple Learning Angles and a Single Learning Period The procedure for obtaining the axis-tilt slope and cross-axis slope parameters from multiple learning angles and a single learning period is similar to the procedure involving multiple learning periods with a single learning angle. In this case, the timestamp $t_1$ is extracted from a first knee corresponding to a first learning angle (e.g., −20 degrees) and the timestamp $t_2$ is extracted from a second learning angle (e.g., −45 degrees) on the same day of the year. The solar positions are calculated for these learning angles and transformed into the tracker reference frame the same as before. However, the knee PSZs for two learning angles are not the same in this case, so the relationship equating two knee PSZs does not apply. Instead, there are two equations for two tracker angles that can be solved for two unknown parameters:

$$R_1 = \theta_{PSZ\_1} - \mathrm{sgn}\theta_{PSZ\_1}\cos^{-1}\left\{\frac{P}{L_m}\cdot(\cos\theta_{PSZ\_1} - m_{lim}\sin\theta_{PSZ\_1})\right\}$$

$$R_2 = \theta_{PSZ\_2} - \mathrm{sgn}\theta_{PSZ\_2}\cos^{-1}\left\{\frac{P}{L_m}\cdot(\cos\theta_{PSZ\_2} - m_{lim}\sin\theta_{PSZ\_2})\right\}$$

In this equation, $R_1$ and $R_2$ are the first and second learning angles, respectively, and $\theta_{PSZ\_1}$ and $\theta_{PSZ\_2}$ are the corresponding knee PSZs. The knee PSZs contain the axis-tilt slope ($\theta_{at}$) and known solar position coordinates for the respective knee timestamps. Thus, these two equations are solved for two unknowns, $\theta_{at}$ and $m_{lim}$. Once $m_{lim}$ is known it may be used to calculate and equivalent row-height difference:

$$\Delta H = \frac{Pm_{lim}}{\mathrm{sgn}\theta_{PSZ}}$$

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

What is claimed is:

1. A method for learning axis-tilt and cross-axis slopes for slope-aware backtracking in single-axis solar tracking systems, the method comprising:

monitoring an amount of power produced by a photovoltaic (PV) panel on a tracker axis during a first learning period by maintaining the PV panel at a learning angle to identify a first knee timestamp on a first backtracking curve for the PV panel;

monitoring an amount of power produced by the PV panel on the tracker axis during a second learning period by maintaining the PV panel at the same learning angle to identify a second knee timestamp on a second backtracking curve for the PV panel, wherein the first learning period and the second learning period occur at different times of a year;

determining a solar azimuth angle and solar zenith angle for the first knee timestamp;

determining a solar azimuth angle and solar zenith angle for the second knee timestamp;

transforming the solar azimuth and solar zenith angles for the first knee timestamp and the solar azimuth and solar zenith angles for the second knee timestamp into a cartesian coordinate system and rotating the transformed solar coordinates into a tracker reference frame;

determining an axis-tilt angle;

determining a projected solar zenith angle;

determining a limiting cross-axis slope, wherein determining the limiting cross-axis slope includes an evaluation of the following equation:

$$\Delta R = \mathrm{sgn}\,\theta_{PSZ}\cos^{-1}\left\{\frac{P}{L_m}\cdot(\cos\theta_{PSZ} - m_{lim}\sin\theta_{PSZ})\right\};$$

determining, based on the axis-tilt angle and the limiting cross-axis slope, a plurality of backtracking angles for the tracker axis by varying known solar azimuth and solar zenith angles to create a backtracking curve; and rotating the PV panel on the tracker axis according to the backtracking curve.

2. The method of claim 1, wherein the first learning period and the second learning period are carried out at different times of the year.

3. The method of claim 2, wherein the first learning period and the second learning period are separated by at least one week.

4. The method of claim 1, wherein transforming the solar azimuth angle and the solar zenith angle for the first knee timestamp ($\theta_{azimuth}$, and $\theta_{zenith1}$, respectively) into the cartesian coordinate system includes evaluating the following equations:

$$S_{x1} = \sin\theta_{zenith1}\sin\theta_{azimuth1}$$

$$S_{y1} = \sin\theta_{zenith1}\cos\theta_{azimuth1}$$

$$S_{z1} = \cos\theta_{zenith1}.$$

5. The method of claim 1, wherein rotating the transformed solar coordinates into the tracker reference frame includes a rotation to account for a tracker axis-azimuth angle ($\theta_{aa}$) and a rotation to account for a tracker axis-tilt angle ($\theta_{at}$).

6. The method of claim 5, wherein the rotation to account for the tracker axis-azimuth includes evaluating the following equations:

$$S_{x_{aa_1}} = S_{x_1}\cos\theta_{aa} - S_{y_1}\sin\theta_{aa}$$

$$S_{y_{aa_1}} = S_{x_1}\sin\theta_{aa} + S_{y_1}\cos\theta_{aa}$$

$$S_{z_{aa_1}} = S_{z_1}.$$

7. The method of claim 5, wherein the rotation to account for the tracker axis-tilt further includes evaluating the following equations:

$$S_{x_{at_1}} = S_{x_{aa_1}}$$

-continued $$S_{y_{at_1}} = S_{y_{aa_1}} \cos\theta_{at} - S_{z_{aa_1}} \sin\theta_{at}$$

$$S_{z_{at_1}} = S_{y_{aa_1}} \sin\theta_{at} + S_{z_{aa_1}} \cos\theta_{at}.$$

8. The method of claim 1, wherein transforming the solar azimuth angle and the solar zenith angle for the second knee timestamp ($\theta_{azimuth2}$ and $\theta_{zenith2}$, respectively) to into the cartesian coordinates includes evaluating the following equations:

$$S_{x_2} = \sin\theta_{zenith_2} \sin\theta_{azimuth_2}$$

$$S_{y_2} = \sin\theta_{zenith_2} \cos\theta_{azimuth_2}$$

$$S_{z_2} = \cos\theta_{zenith_2}.$$

9. The method of claim 1, wherein:

rotating the transformed solar coordinates into the tracker reference frame includes a rotation to account for a tracker axis-azimuth angle ($\theta_{aa}$) and a rotation to account for a tracker axis-tilt angle ($\theta_{at}$); and the rotation to account for the tracker axis-azimuth includes evaluating one or more of the following equations:

$$S_{x_{aa_2}} = S_{x_2} \cos\theta_{aa} - S_{y_2} \sin\theta_{aa}$$

$$S_{y_{aa_2}} = S_{x_2} \sin\theta_{aa} + S_{y_2} \cos\theta_{aa}$$

$$S_{z_{aa_2}} = S_{z_2}.$$

10. The method of claim 1, wherein:

rotating the transformed solar coordinates into the tracker reference frame includes a rotation to account for a tracker axis-azimuth angle ($\theta_{aa}$) and a rotation to account for a tracker axis-tilt angle ($\theta_{at}$); and the rotation to account for the tracker axis-tilt further includes evaluating the following equations:

$$S_{x_{at_2}} = S_{x_{aa_2}}$$

$$S_{y_{at_2}} = S_{y_{aa_2}} \cos\theta_{at} - S_{z_{aa_2}} \sin\theta_{at}$$

$$S_{z_{at_2}} = S_{y_{aa_2}} \sin\theta_{at} + S_{z_{aa_2}} \cos\theta_{at}.$$

11. The method of claim 1, wherein determining the axis-tilt angle includes evaluating the following equation:

$$\theta_{at} = \tan^{-1}\left(\frac{S_{x_{aa_2}} S_{z_{aa_1}} - S_{x_{aa_1}} S_{z_{aa_2}}}{S_{x_{aa_1}} S_{y_{aa_2}} - S_{x_{aa_2}} S_{y_{aa_1}}}\right).$$

12. The method of claim 1, wherein determining a projected solar zenith angle ($\theta_{PSZ}$) includes evaluating at least one of the following equations:

$$\theta_{PSZ} = \text{atan2}(-S_{x_{at_1}}, S_{z_{at_1}})$$

$$\theta_{PSZ} = \text{atan2}(-S_{x_{at_2}}, S_{z_{at_2}}).$$

13. A method for learning axis-tilt and cross-axis slopes for slope-aware backtracking in single-axis solar tracking systems, the method comprising:

monitoring an amount of power produced by a photovoltaic (PV) panel on a tracker axis during a single learning period using a first learning angle to identify a first knee timestamp on a backtracking curve for the PV panel;

monitoring an amount of power produced by the PV panel on the tracker axis during the same learning period using a second learning angle to identify a second knee timestamp on the same backtracking curve for the PV panel, wherein the first learning angle and the second learning angle are different angles;

determining a solar azimuth angle and solar zenith angle for the first knee timestamp;

determining a solar azimuth angle and solar zenith angle for the second knee timestamp;

transforming the solar azimuth and solar zenith angles for the first knee timestamp and the solar azimuth and solar zenith angles for the second knee timestamp into a cartesian coordinate system and rotating into the tracker reference frame;

determining an axis-tilt angle;

determining a limiting cross-axis slope; wherein determining the limiting cross-axis slope includes evaluating the following equations:

$$R_1 = \theta_{PSZ\_1} - \operatorname{sgn}\theta_{PSZ\_1} \cos^{-1}\left\{\frac{P}{L_m}\cdot(\cos\theta_{PSZ\_1} - m_{lim}\sin\theta_{PSZ\_1})\right\}$$

$$R_2 = \theta_{PSZ\_2} - \operatorname{sgn}\theta_{PSZ\_2} \cos^{-1}\left\{\frac{P}{L_m}\cdot(\cos\theta_{PSZ\_2} - m_{lim}\sin\theta_{PSZ\_2})\right\};$$

determining, based on the axis-tilt angle and the limiting cross-axis slope, a plurality of backtracking angles for the tracker axis by varying known solar azimuth and solar zenith angles to create a backtracking curve; and rotating the PV panel on the tracker axis according to the backtracking curve.

14. The method of claim 13, wherein the firstlearning angle and the secondlearning angle are separated by at least 5 degrees.

15. The method of claim 13, wherein transforming the solar azimuth angle and the solar zenith angle for the first knee timestamp ($\theta_{azimuth1}$ and $\theta_{zenith1}$, respectively) into the cartesian coordinate system includes evaluating the following equations:

$$S_{x_1} = \sin\theta_{zenith_1} \sin\theta_{azimuth_1}$$

$$S_{y_1} = \sin\theta_{zenith_1} \cos\theta_{azimuth_1}$$

$$S_{z_1} = \cos\theta_{zenith_1}.$$

16. The method of claim 13, wherein rotating the transformed solar coordinates into the tracker reference frame includes a rotation to account for a tracker axis-azimuth angle ($\theta_{aa}$) and a rotation to account for a tracker axis-tilt angle ($\theta_{at}$).

17. The method of claim 16, wherein the rotation to account for the tracker axis-azimuth includes evaluating the following equations:

$$S_{x_{aa_1}} = S_{x_1}\cos\theta_{aa} - S_{y_1}\sin\theta_{aa}$$

$$S_{y_{aa_1}} = S_{x_1}\sin\theta_{aa} + S_{y_1}\cos\theta_{aa}$$

$$S_{z_{aa_1}} = S_{z_1}.$$

18. The method of claim 16 wherein the rotation to account for the tracker axis-tilt further includes evaluating the following equations:

$$S_{x_{at_1}} = S_{x_{aa_1}}$$

$$S_{y_{at_1}} = S_{y_{aa_1}}\cos\theta_{at} - S_{z_{aa_1}}\sin\theta_{at}$$

$$S_{z_{at_1}} = S_{y_{aa_1}}\sin\theta_{at} + S_{z_{aa_1}}\cos\theta_{at}.$$

19. The method of claim 13, wherein transforming the solar azimuth angle and the solar zenith angle for the second knee timestamp ($\theta_{azimuth}$, and $\theta_{zenith2}$, respectively) to into the cartesian coordinates includes evaluating the following equations:

$$S_{x_2} = \sin\theta_{zenith_2}\sin\theta_{azimuth_2}$$

$$S_{y_2} = \sin\theta_{zenith_2}\cos\theta_{azimuth_2}$$

$$S_{z_2} = \cos\theta_{zenith_2}.$$

20. The method of claim 13, wherein:

rotating the transformed solar coordinates into the tracker reference frame includes a rotation to account for a tracker axis-azimuth angle ($\theta_{aa}$) and a rotation to account for a tracker axis-tilt angle ($\theta_{at}$); and the rotation to account for the tracker axis-azimuth includes evaluating one or more of the following equations:

$$S_{x_{a_2}} = S_{x_2}\cos\theta_{aa} - S_{y_2}\sin\theta_{aa}$$

$$S_{y_{aa2}} = S_{x_2}\sin\theta_{aa} + S_{y_2}\cos\theta_{aa}$$

$$S_{z_{aa_2}} = S_{z_2}.$$

21. The method of claim 13, wherein:

rotating the transformed solar coordinates into the tracker reference frame includes a rotation to account for a tracker axis-azimuth angle ($\theta_{aa}$) and a rotation to account for a tracker axis-tilt angle ($\theta_{at}$); and the rotation to account for the tracker axis-tilt further includes evaluating the following equations:

$$S_{x_{at_2}} = S_{x_{aa_2}}$$

$$S_{y_{at_2}} = S_{y_{aa_2}}\cos\theta_{at} - S_{z_{aa_2}}\sin\theta_{at}$$

$$S_{z_{at_2}} = S_{y_{aa_2}}\sin\theta_{at} + S_{z_{aa_2}}\cos\theta_{at}.$$

22. The method of claim 13, wherein determining the axis-tilt angle includes evaluating the following equations:

$$\theta_{PSZ_1} = \text{atan } 2(-S_{x_{at_1}}, S_{z_{at_1}})$$

$$\theta_{PSZ_2} = \text{atan } 2(-S_{x_{at_2}}, S_{z_{at_2}})$$

* * * * *